(12) United States Patent
Ishikawa

(10) Patent No.: US 6,864,717 B2
(45) Date of Patent: Mar. 8, 2005

(54) SIGNAL TRANSMISSION SYSTEM

(75) Inventor: Toru Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 718 days.

(21) Appl. No.: 09/799,961

(22) Filed: Mar. 5, 2001

(65) Prior Publication Data

US 2001/0021957 A1 Sep. 13, 2001

(30) Foreign Application Priority Data

Mar. 8, 2000 (JP) .................................... P2000-063935

(51) Int. Cl.$^7$ ......................................... H03K 19/0175
(52) U.S. Cl. ............................ 326/68; 326/62; 326/82; 326/86
(58) Field of Search ............................. 326/62, 68, 80, 326/81, 82, 83, 86

(56) References Cited

U.S. PATENT DOCUMENTS 5,604,450 A * 2/1997 Borkar et al. ................. 326/82
6,078,192 A * 6/2000 Mitten et al. ................. 326/82

FOREIGN PATENT DOCUMENTS

| JP | 44-13852 | 6/1969 |
| JP | 55-3221 | 1/1980 |
| JP | 59-40737 | 3/1984 |
| JP | 60-254929 | 12/1985 |
| JP | 2-174445 | 7/1990 |
| JP | 5-236046 | 9/1993 |
| JP | 9-18504 | 1/1997 |

* cited by examiner

Primary Examiner—Daniel D. Chang
(74) Attorney, Agent, or Firm—Scully, Scott, Murphy & Presser

(57) ABSTRACT

A signal transmission system is provided which can accurately recognize data even if two signals are superimposed on each other on the same signal line. The potential of a read signal indicating read data is designated (a), and the potential of a write signal indicating write data is designated (b). Consequently, the potential of a signal where the read signal and the write signal are superimposed (that is, the superimposed signal) is designated as (c). As a result, the value of write data can be accurately recognized from the superimposed signal, using a reference potential of 1.75V. On the other hand, the value of read data can be accurately recognized from the superimposed signal, using the reference potential of 2.25V when the write data is "H", or 1.25V when the write data is "L".

8 Claims, 7 Drawing Sheets

SIGNAL TRANSMISSION SYSTEM

BACKGROUND OF THE INVENTION

1. Field of the Invention

The present invention relates to a signal transmission system in which two signals are directed in opposite directions to each other on the same signal line.

2. Description of the Related Art

Recently, the operating speed of personal computers is increasing remarkably, and within the personal computer, data transfer is carried out between the microprocessor and memory at a cycle of from 800 MHz to 1 GHz. In this case, one cycle corresponds to about 1 ns, and data proceeds about 0.1 m on the printed board constituting the personal computer in a period of time of 1 ns. If it is assumed that the microprocessor and the memory are away from each other by 0.1 m or more, even if the microprocessor outputs data at a certain cycle, the next data is output before the previous data reaches the memory. In other words, a plurality of data exist on a transmission line connecting the microprocessor and the memory.

Moreover, normally a line for transmitting the data has bidirectionality, and in a certain cycle, the microprocessor may output write data to the memory, and in a certain cycle, the microprocessor may read out read data from the memory. As described above, since a timewise difference exists between the microprocessor and the memory, when the microprocessor tries to output data, data output from the memory may also reach the microprocessor. In such a case, a problem arises in that the microprocessor cannot recognize the data accurately. This problem will now be specifically described with reference to FIG. 6.

FIG. 6 is a block diagram showing a configuration example of a conventional signal transmission system.

The system shown in FIG. 6 includes one master device 110 and a plurality of slave devices 120 (in FIG. 6, two as an example).

The master device 110 is a device which "activates" the slave devices 120 to read/write data.

The slave devices 120 are devices which "are activated" to read/write data by the master device 110.

That is to say, at the time of read, the master device 110 transmits a read command to a certain slave device 120, and the slave device 120 returns the read data to the master device 110.

On the other hand, at the time of write, the master device 110 transmits a write command and write data to a certain slave device 120.

As is understood, in FIG. 6, all data forwarded from the master device 110 to the slave device 120 is write data, and all data forwarded from the slave device 120 to the master device 110 is read data.

In order to transmit these commands and data, each device is connected to a command bus and a data bus.

Though not shown in the figure, each signal line constituting the data bus (hereinafter referred to as a "data line") is pulled up to 2.5 V via a resistance $R_1$ of 50 Ω.

The master device 110 comprises a circuit for interfacing with the data bus (hereinafter referred to as "MIC").

The MIC has the following functions:
(1) to change a potential at a connection point of the MIC and the data line, based on a value of the write data input to the MIC; and
(2) to recognize and output a value of the read data, based on the potential at the connection point of the MIC and the data line.

In FIG. 6, the MIC is input with the write data from a main circuit (not shown) in the master device 110, and outputs the read data to the main circuit.

The slave device 120 also comprises a circuit for interfacing with the data bus (hereinafter referred to as "SIC").

The SIC has the following functions:
(1) to change a potential at a connection point of the SIC and a data line, based on a value of the read data input to the SIC; and
(2) to recognize and output a value of the write data, based on the potential at the connection point of the SIC and the data line.

In FIG. 6, the SIC is input with the read data from a main circuit (not shown) of the slave device 120, and outputs the write data to the main circuit.

In this manner, the MIC and the SIC perform mutual transformation between binary information processed by a logic circuit (for example, the main circuit) and information indicated by the potential on the data line.

Accordingly, in the description below, the binary information processed by the logic circuit is referred to as "data", and the information indicated by the potential on the data line is referred to as a "signal".

That is to say, on the data line, a signal indicating a value of the "read data" is referred to as a "read signal", and a signal indicating a value of the "write data" is referred to as a "write signal".

Moreover, in FIG. 6, the position of the master device 110 (i.e., a connection point of the master device 110 and the bus) is designated as point A, and the position of a slave device 120 adjacent to the master device 110 (i.e., a connection point of that slave device 120 and the bus) is designated as point B, and the position of a slave device 120 adjacent to that slave device 120 (i.e., a connection point of that slave device 120 and the bus) is designated as point C.

In the description below, if it is necessary to distinguish the slave device at point B from the slave device at point C, the former is referred to as "slave device B", and the latter is referred to as "slave device C".

Furthermore, in FIG. 6, a clock generated by a predetermined clock generator (not shown) is input, through a read clock line, in the order of slave device C, slave device B, and master device 110, and is used as a read clock in each device. The clock having reached the master device 110 is turned back by the master device 110. The turned back clock is input, through a write clock line, in the order of master device 110, slave device B, and slave device C, and is then used as a write clock in each device.

In addition, in FIG. 6, due to a propagation delay on the signal line, the time for one cycle of the clock is required for the signal to propagate between respective adjacent devices.

As described above, by assuming that the propagation delay time between respective adjacent devices is one cycle, even if a propagation delay occurs in the clock, the phase of all clocks input to each device (that is, the read clock and the write clock input to each device) becomes equal.

This hypothetical condition is for facilitating the description of a transfer timing for the command and data (see FIG. 7), by making the phase of all clocks equal, and is not for limiting the signal transmission system to which the present invention is applied. That is to say, even if the propagation delay time between respective adjacent devices is an other value (½ cycle, ⅓ cycle, etc.), the present invention is also applicable.

The operation of the signal transmission system according to the above configuration will now be described.

FIG. 7 is a timing chart showing one example of a transfer timing of commands and data. In FIG. 7, A denotes the master device 110, B denotes the slave device B, and C denotes the slave device C. Also in FIG. 7, there is shown a transfer timing when read is performed immediately after the master device 110 has performed write (that is, a read command is output immediately after the cycle in which a write command has been output).

The master device 110 first outputs a write command for writing the write data in the slave device B.

The master device 110 outputs a read command for reading the read data from the slave device C, in a cycle immediately after the cycle in which the write command has been output.

The write command and the read command reach the slave device B after a propagation delay time for one cycle, and reach the slave device C after a further propagation delay time for one cycle.

When the read command reaches the slave device C, the slave device C outputs a read signal corresponding to the read command, in a cycle immediately after the cycle in which the read command has been input.

The read signal reaches the slave device B after a propagation delay time for one cycle, and reaches the master device 110 after a further propagation delay time for one cycle.

On the other hand, the master device 110 outputs a write signal corresponding to the write command, in a cycle four cycles after the cycle in which the write command has been output.

The write signal reaches the slave device B after a propagation delay time for one cycle, and reaches the slave device C after a further propagation delay time for one cycle.

Data write to the slave device B and data read from the slave device C are performed by the above described operation.

In FIG. 7, the write signal to the slave device B and the read signal to the master device 110 reach the slave device B at the same timing. As a result, the write signal and the read signal are superimposed on each other in the slave device B, and the SIC in the slave device B cannot recognize the write data accurately.

Moreover, in FIG. 7, an example is shown in which the write signal to the slave device B is superimposed on the read signal in the slave device B. However, at the time of input of the read signal, if the master device 110 does not perform control of inhibiting the output of the write signal, the read signal for the master device 110 may be superimposed on the write signal in the master device 110. In this case, the MIC in the master device 110 cannot recognize the read data accurately.

As described above, in the conventional signal transmission system, there is a problem in that "when two signals are superimposed on each other on the same signal line, data cannot be recognized accurately."

The above problem can be solved by shifting the output timing of the command. FIG. 8 is a timing chart showing one example of timing for solving the above problem.

In FIG. 7, the master device 110 outputs the read command in a cycle immediately after the cycle in which the write command has been output. In FIG. 8, however, the master device 110 outputs the read command in a cycle two cycles after the cycle in which the write command has been output.

Therefore, in FIG. 8, the write signal to the slave device B and the read signal to the master device 110 reach the slave device B at a different timing.

As a result, the write signal and the read signal are not superimposed on each other in the slave device B, and the SIC in the slave device B can accurately recognize the write data.

In FIG. 8, the read signal and the write signal are superimposed on each other in the slave device C, but the write signal is a signal to the slave device B, and not a signal to the slave device C. Hence the output operation of the read signal need not recognize the potential on the data line. Therefore there is no problem even if the read signal and the write signal are superimposed on each other.

In this manner, the above described problem can be solved by shifting the output timing of the command.

However, with the method shown in FIG. 8, it is necessary to delay the output timing of the command, leaving a problem in that the transmission efficiency of the bus decreases, and the command output control by the master device becomes complicated.

SUMMARY OF THE INVENTION

In view of the above situation, it is an object of the present invention to provide a signal transmission system which can accurately recognize data without decreasing the transmission efficiency and without making the control complicated, even if two signals are superimposed on each other on the same signal line.

The invention according to a first aspect is characterized in that, in a predetermined signal line, the amplitude of a first signal directed from a first device to a second device and the amplitude of a second signal directed from the second device to the first device are different.

The invention according to a second aspect is a signal transmission system according to the first aspect, characterized by comprising a third device in which the first signal received from the first device is sent to the second device without changing the amplitude, and the second signal received from the second device is sent to the first device without changing the amplitude.

The invention according to a third aspect is a signal transmission system according to either one of the first and second aspects, characterized in that the amplitude of the first signal is at least twice as large as that of the second signal.

The invention according to a fourth aspect is a signal transmission system according to either one of the first and second aspects, characterized in that the second signal is totally reflected by the first device, and the amplitude of the first signal is at least three times as large as that of the second signal.

The invention according to a fifth aspect is a signal transmission system according to either one of the first and second aspects, characterized in that the amplitude of the second signal is (V0−V1), and the amplitude of the first signal is (V0−V2), and a value indicated by the first signal is recognized using (V1+V2)/2 as a reference potential.

The invention according to a sixth aspect is a signal transmission system according to either one of the first and second aspects, characterized in that the amplitude of the second signal is (V0−V1), and the amplitude of the first signal is (V0−V2), and if the potential of the first signal is V0, a value indicated by the second signal is recognized using (V0+V1)/2 as a reference potential, and if the potential of the first signal is V2, a value indicated by the second signal is recognized using (V1+2V2−V0)/2 as a reference potential.

The invention according to a seventh aspect is a signal transmission system according to the first aspect, characterized in that the first device is a master device, the second device is a slave device, and the first signal is a write signal indicating a value of write data written to the slave device from the master device, and the second signal is a read signal indicating a value of read data read out from the slave device to the master device.

The invention according to an eighth aspect is a signal transmission system according to the second aspect, characterized in that the first device is a master device, the second device is a slave device, and the first signal is a write signal indicating a value of write data written to the slave device from the master device, and the second signal is a read signal indicating a value of read data read out from the slave device to the master device, and the third device is a register for latching the write data and the read data.

The invention according to a ninth aspect is a signal transmission system according to the eighth aspect, characterized in that the line length of the signal line for transmitting the write signal from the register to the slave device is shorter than that of the signal line for transmitting the read signal from the register to the slave device.

DETAILED DESCRIPTION OF THE PREFERRED EMBODIMENTS

Basic Concept

At first, the basic concept of the present invention will be described.

The present invention is characterized in that in a predetermined signal line, the amplitude of a first signal directed from a first device to a second device and the amplitude of a second signal directed from the second device to the first device are different.

Figure 6:
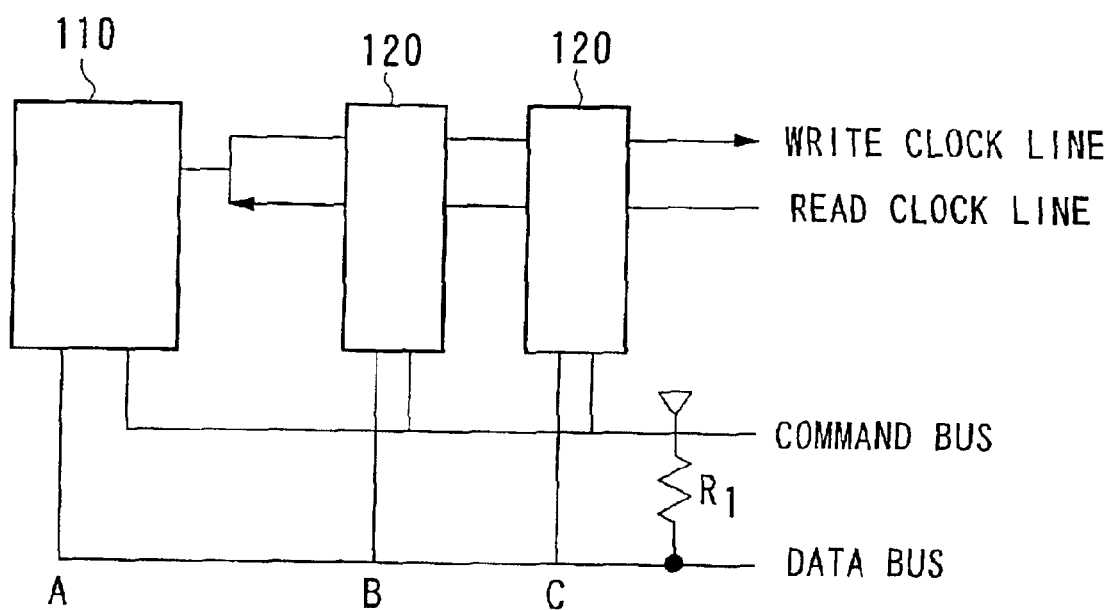
FIG. 6 is a block diagram showing a configuration example of a conventional signal transmission system.

If this characteristic is applied to a signal transmission system in FIG. 6, "the first device" is a master device, "the second device" is a slave device, and "the first signal" is a write signal, and "the second signal" is a read signal.

Figure 1A:
FIGS. 1A, 1B and 1C are diagrams showing the basic concept of the present invention.
Figure 1B:
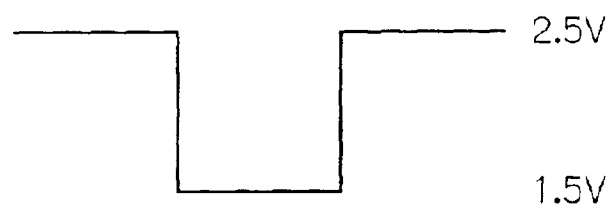
Figure 1C:
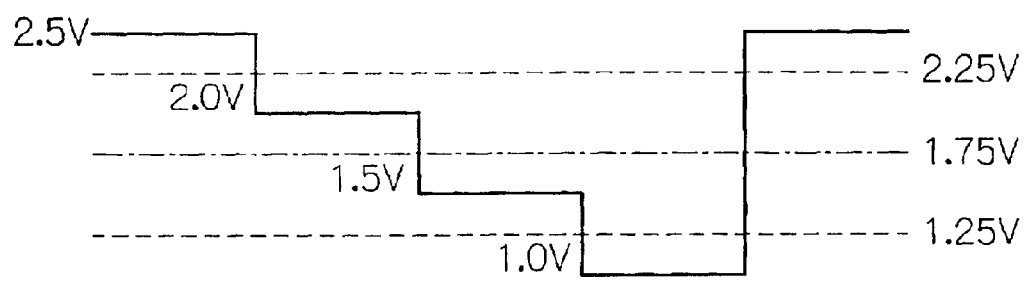

FIG. 1 (FIGS. 1A to 1C) is a diagram showing the basic concept of the present invention. In FIG. 1A shows an amplitude of the read signal, FIG. 1B shows an amplitude of the write signal, and FIG. C shows an amplitude of a signal in which the read signal and the write signal are superimposed on each other (hereinafter referred to as a "superimposed signal").

As shown in FIG. 1, with the present invention, it is desired that the amplitude of the write signal is at least twice as large as that of the read signal (hereinafter, a ratio of the amplitude of the write signal to the amplitude of the read signal is referred to as an "amplitude ratio").

The maximum value of the amplitude of the write signal is limited by a pulling-up power supply voltage Vcc, and when the Vcc is 2.5V, the maximum value of the amplitude of the write signal becomes 2.5V. Accordingly, if it is assumed that the amplitude of the read signal is 0.5V, the amplitude ratio is limited to five times.

For example, with regard to the read signal, the amplitude of the read signal is made to be 0.5V, by designating the potential of the read signal indicating read data "H" as 2.5V, and designating the potential of the read signal indicating read data "L" as 2.0V.

On the other hand, with regard to the write signal, the amplitude of the write signal is designated as 1.0V, by designating the potential of the write signal indicating write data "H" as 2.5V, and designating the potential of the write signal indicating write data "L" as 1.5V.

As a result, the potential of the superimposed signal becomes 2.5V if the read data is "H" and the write data is "H", or 2.0V if the read data is "L" and the write data is "H", or 1.5V if the read data is "H" and the write data is "L", or 1.0V if the read data is "L" and the write data is "L".

In this manner, no matter what value for the read data, the value of the write data can be accurately recognized from the superimposed signal, using the reference potential of 1.75V.

Also, when the write data is "H", the value of read data can be accurately recognized from the superimposed signal, using the reference potential of 2.25V.

Moreover, when the write data is "L", the value of read data can be accurately recognized from the superimposed signal, using the reference potential of 1.25V.

(First Embodiment)

A first embodiment of the present invention will now be described with reference to drawings.

Figure 2:
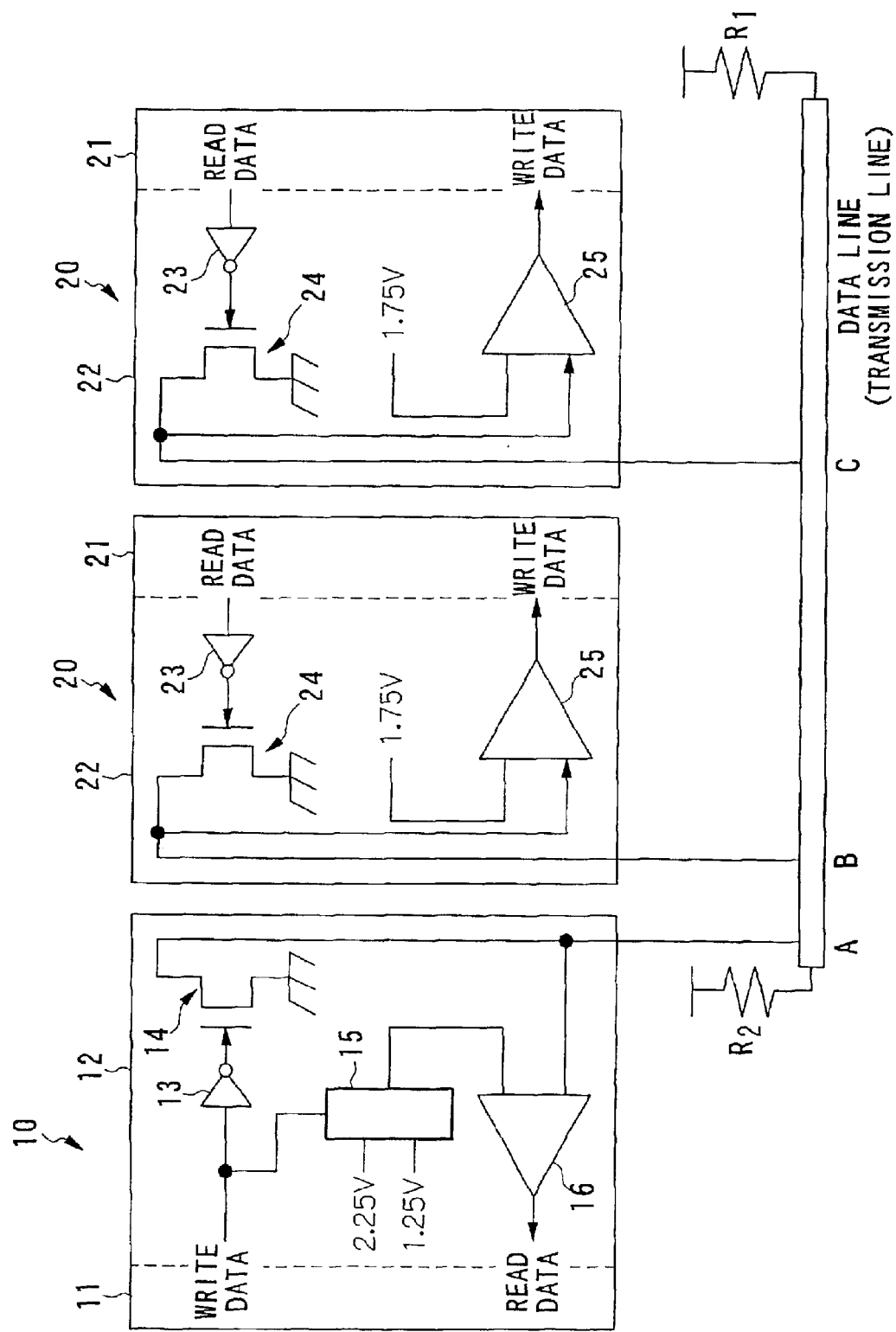
FIG. 2 is a block diagram showing a configuration example of a signal transmission system according to a first embodiment of the present invention.

FIG. 2 is a block diagram showing a configuration example of a signal transmission system according to the first embodiment of the present invention. In FIG. 2, only the relationship between each device and a data bus is shown, and a clock line and a command bus are omitted.

The system shown in FIG. 2 comprises one master device 10 and a plurality of (in FIG. 2, two as an example) slave devices 20. The master device 10 comprises a main circuit 11 and a MIC 12. The slave device 20 comprises a main circuit 21 and a SIC 22. The positions of each device (point A, point B and point C) are the same as those shown in FIG. 6.

The configuration of this system and that of the conventional system (see FIG. 6) are different only in the MIC and the SIC.

As shown in FIG. 2, the MIC 12 in this system comprises an inverter 13, a transistor 14, a selector 15, a comparator 16 and pull-up resistors R1, R2.

The inverter 13 inverts the write data input to the MIC 12.

If the output of the inverter 13 is "H", the transistor 14 becomes ON state, to thereby let an electric current having a first current value flow from a connection point of the MIC 12 and the data line to GND. In this embodiment, the first current value is assumed to be 20 mA as an example. On the other hand, if the output of the inverter 13 is "L", the transistor 14 becomes OFF state so as not to let the current flow.

The selector 15 uses the write data input to the MIC 12 as a selection signal. To the selector 15, 2.25V and 1.25V are input as the reference voltage, and if the selection signal is "H", the selector 15 selectively outputs 2.25V, and if the selection signal is "L", the selector 15 selectively outputs 1.25V.

The comparator 16 uses the output from the selector 15 as the reference voltage, and outputs "H", if the potential at the connection point of the MIC 12 is higher than the reference voltage, and outputs "L", if the potential at the connection point of the MIC 12 is lower than the reference voltage. The output of the comparator 16 is output from the MIC 12 to the main circuit 11, as the read data recognized by the MIC 12.

As shown in FIG. 2, the SIC 22 in this system comprises an inverter 23, a transistor 24 and a comparator 25.

The inverter 23 inverts the read data input to the SIC 22.

If the output of the inverter 23 is "H", the transistor 24 becomes ON state, to thereby let an electric current having a second current value flow from a connection point of the SIC 22 and the data line to GND. In this embodiment, the second current value is assumed to be 10 mA as an example. On the other hand, if the output of the inverter 23 is "L", the transistor 24 becomes OFF state so as not to let the current flow.

The comparator 25 uses 1.75V as the reference voltage, and outputs "H", if the potential at the connection point of the SIC 22 is higher than the reference voltage, and outputs "L", if the potential at the connection point of the SIC 22 is lower than the reference voltage. The output of the comparator 25 is output from the SIC 22, as the write data recognized by the SIC 22.

The data line is constituted of a transmission line, and if the terminating resistances located at the opposite ends of the data line are assumed to be 50 Ω, the impedance of the transmission line is constituted of 50 Ω.

The operation of the signal transmission system according to the above configuration will now be described.

The operation of this system and the operation of the conventional system (see FIG. 6) are different only in the above functions of the MIC (that is, the potential changing operation and the read data recognizing operation) and the above functions of the SIC (that is, the potential changing operation and the write data recognizing operation).

Therefore, these operations will now be described.

(1) Potential Change by Means of the MIC 12

When the write data "H" is input to the MIC 12, the inverter 13 inverts the write data "H" to "L". The transistor 14 becomes OFF state since the inverted write data "L" is input thereto, and hence the current is not made to flow. As a result, the potential at the connection point of the MIC 12 does not change (that is, a voltage drop of 0V occurs).

On the other hand, when the write data "L" is input to the MIC 12, the inverter 13 inverts the write data "L" to "H". The transistor 14 thus becomes ON state since the inverted write data "H" is input thereto, so as to let the current of 20 mA flow from the connection point of the MIC 12 to GND. As a result, a voltage drop of 50 Ω×20 mA=1.0 V occurs at the connection point of the MIC 12.

The potential change which occurs at the connection point of the MIC 12 propagates on the data line as a write signal.

(2) Potential Change by Means of the SIC 22

When the read data "H" is input to the SIC 22, the inverter 23 inverts the read data "H" to "L". The transistor 24 becomes OFF state since the inverted read data "L" is input thereto, and hence the current is not made to flow. As a result, the potential at the connection point of the SIC 22 does not change (that is, a voltage drop of 0V occurs).

On the other hand, when the read data "L" is input to the SIC 22, the inverter 23 inverts the read data "L" to "H". The transistor 24 thus becomes ON state since the inverted read data "H" is input thereto, so as to let the current of 20 mA flow from the connection point of the SIC 22 to GND. As a result, a voltage drop of 50 Ω/2×20 mA=0.5 V occurs at the connection point of the SIC 22, due to the data line located on both sides.

These potentials which occur at the connection point of the SIC 22 propagate in the left and right directions on the data line as the read signal. The propagated signal is terminated by the terminating resistance, and hence no reflection occurs.

(3) Potential of the Superimposed Signal

As a result of the potential change by means of the MIC 12 and the SIC 22, the potential of the superimposed signal becomes 2.5 V, if the read data indicated by the read signal of the superimposed signal is "H", and the write data indicated by the write signal of the superimposed signal is "H", or 2.0 V if the read data is "L" and the write data is "H", or 1.5 V if the read data is "H" and the write data is "L", or 1.0 V if the read data is "L" and the write data is "L". This is the same as the basic concept of the present invention shown in FIG. 1C.

(4) Read Data Recognition by Means of the MIC 12

The read data recognition operation by means of the MIC 12 differs depending on the value of the write data input to the MIC 12 at the time of the recognition operation.

(4-1) In the Case Where the Write Data is "H"

When the write data input to the MIC 12 is "H", the selector 15 selectively outputs 2.25 V.

The comparator 16 uses 2.25 V as the reference potential.

The comparator 16 outputs "H" if the potential at the connection point of the MIC 12 is higher than the reference potential, and outputs "L" if the potential at the connection point is lower than the reference potential.

The output of the comparator 16 is output from the MIC 12 as the read data recognized by the MIC 12.

As shown in FIG. 1C, when the write data is "H", the potential of the superimposed signal is 2.5 V if the read data is "H", and 2.0 V if the read data is "L". Therefore, if the write data is "H", the value of the read data can be accurately recognized from the superimposed signal, using the reference potential of 2.25 V.

(4-2) In the Case Where the Write Data is "L"

When the write data input to the MIC 12 is "L", the selector 15 selectively outputs 1.25 V.

The comparator 16 uses 1.25 V as the reference potential.

The comparator 16 outputs "H" if the potential at the connection point of the MIC 12 is higher than the reference potential, and outputs "L" if the potential at the connection point is lower than the reference potential.

The output of the comparator 16 is output from the MIC 12 as the read data recognized by the MIC 12.

As shown in FIG. 1C, when the write data is "L", the potential of the superimposed signal is 1.5 V, if the read data is "H", and 1.0 V if the read data is "L". Therefore, if the write data is "L", the value of the read data can be accurately recognized from the superimposed signal, using the reference potential of 1.25 V.

(5) Write Data Recognition by Means of the SIC 22

The comparator 25 uses 1.75 V as the reference potential.

The comparator 25 outputs "H" if the potential at the connection point of the SIC 22 is higher than the reference potential, and outputs "L" if the potential at the connection point is lower than the reference potential.

The output of the comparator 25 is output from the SIC 22 as the write data recognized by the SIC 22.

As shown in FIG. 1C, the potential of the superimposed signal is 2.5 V or 2.0 V, if the write data is "H", and 1.5 V or 1.0 V if the write data is "L". Therefore, no matter what value for the read data, the value of the write data can be accurately recognized from the superimposed signal, using the reference potential of 1.75 V.

(Second Embodiment)

A second embodiment of the present invention will now be described with reference to drawings.

Figure 3:
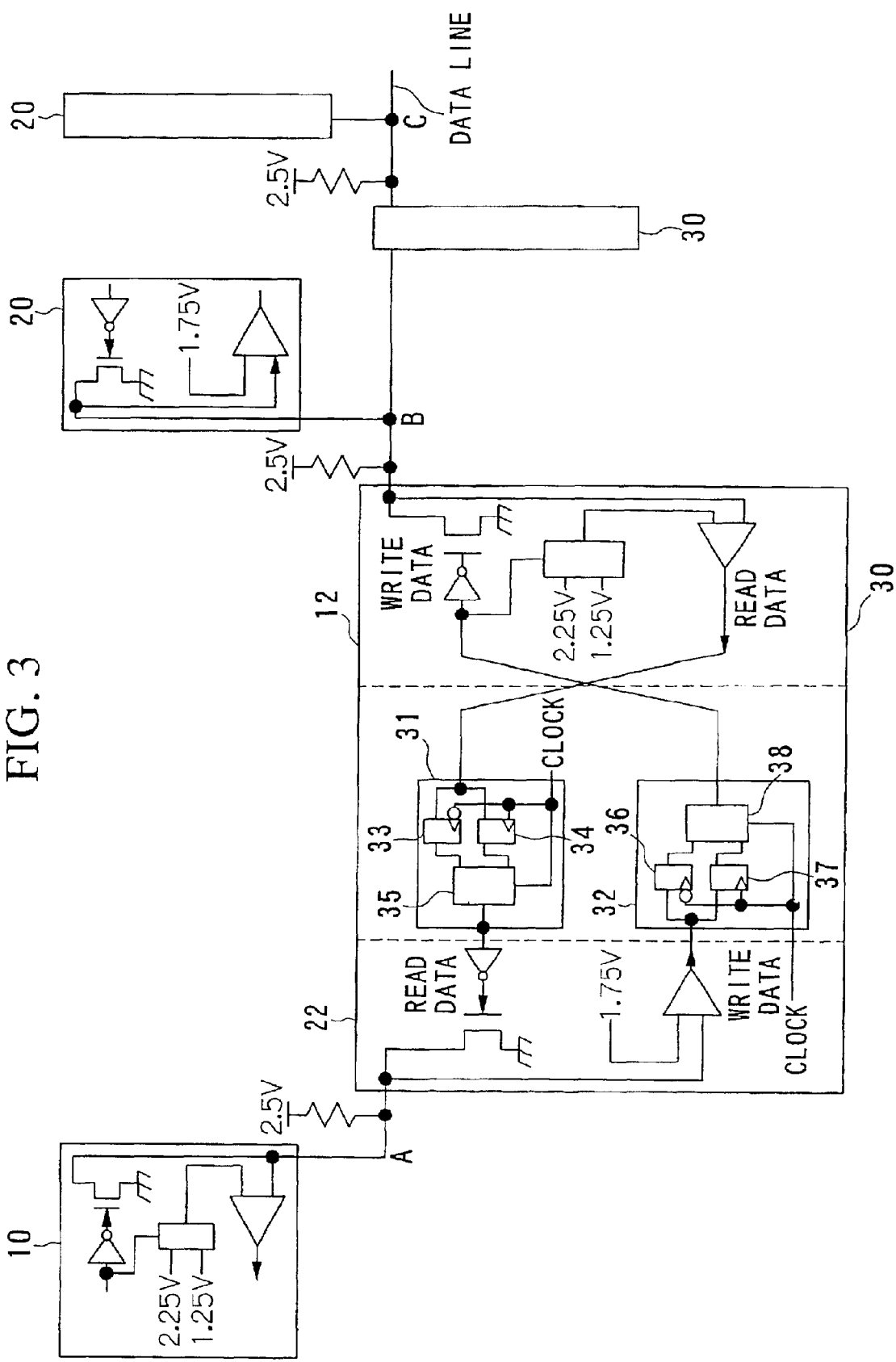
FIG. 3 is a block diagram showing a configuration example of a signal transmission system according to a second embodiment of the present invention.

FIG. 3 is a block diagram showing a configuration example of a signal transmission system according to the second embodiment of the present invention.

The configuration and the positions (point A, point B and point C) of the master device 10 and the slave devices 20 of the system shown in FIG. 3 are same as the configuration and the positions shown in FIG. 2.

The configuration of this system and that of the system in the first embodiment (see FIG. 2) are largely different in that a register 30 is provided between respective devices in this embodiment. The register 30 corresponds to "the third device" according to the second aspect of the invention.

Also in this system, as in the system of the first embodiment, the time for one cycle of the clock is required for the signal to propagate between respective adjacent devices. However, in this system, this is performed by a latch operation of the register 30 only with respect to the data signal (in the system of the first embodiment, this is performed by propagation delay on the signal line). That is to say, in this system, propagation delay on the data line does not occur.

Figure 7:
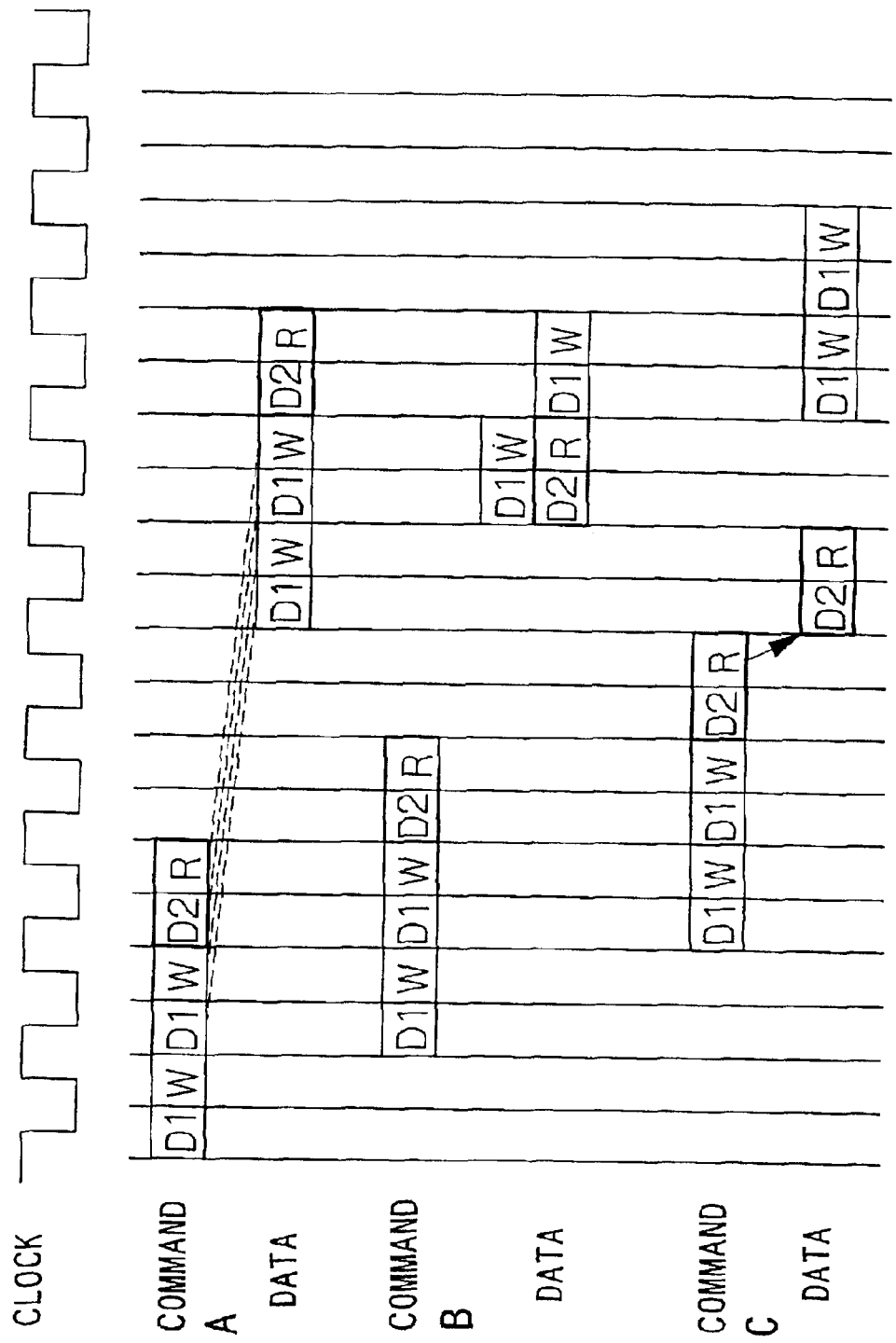
FIG. 7 is a timing chart showing one example of a transfer timing of commands and data.
Figure 8:
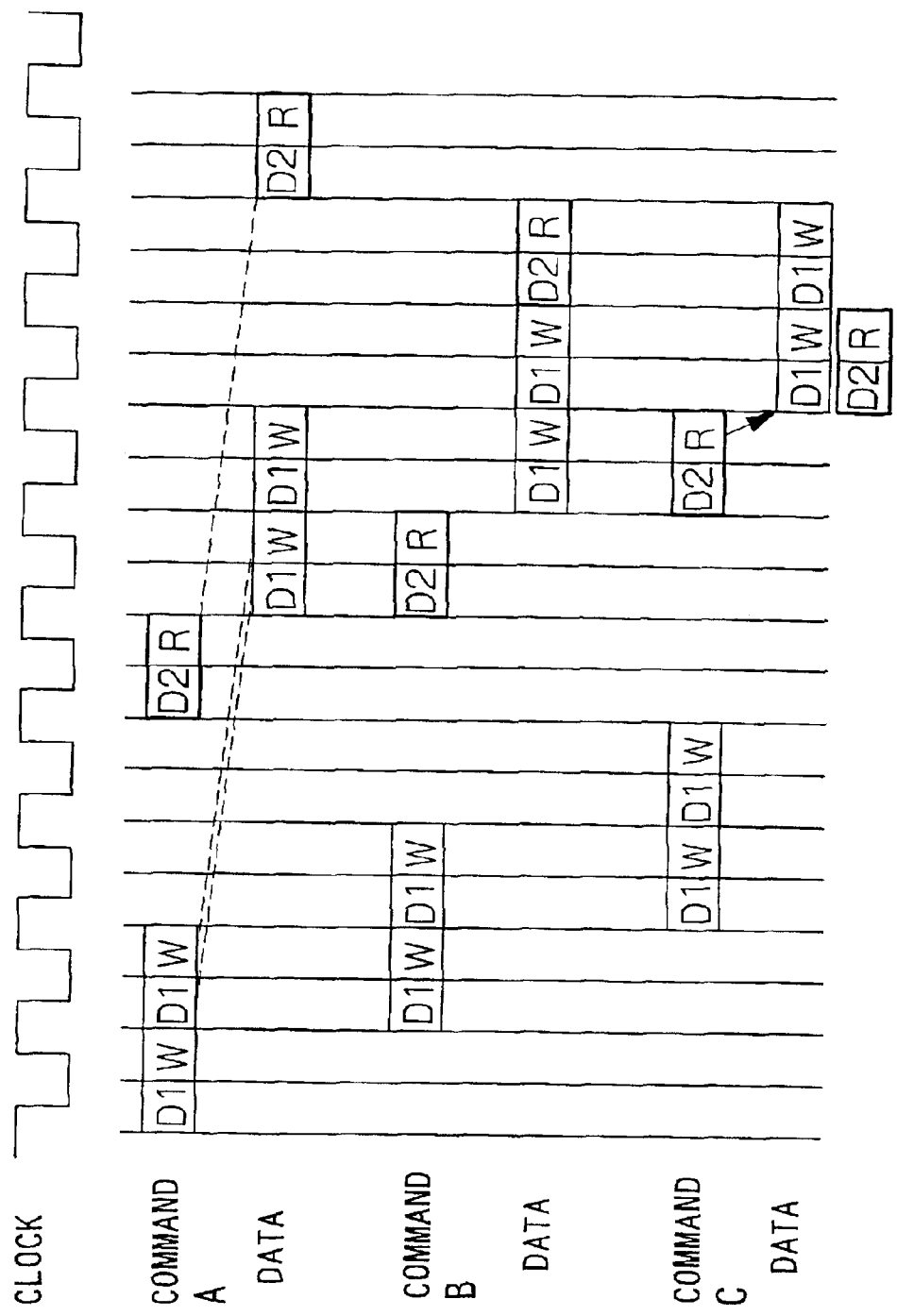
FIG. 8 is a timing chart showing one example of a timing for solving the problems of the system shown in FIG. 6.

This hypothetical condition is for facilitating comparison between both systems by making the transfer timing (see FIG. 7) of both systems equal, and is not for limiting the invention in the second embodiment. That is to say, even if propagation delay occurs on the data line, the invention of the second embodiment is applicable.

Moreover, the value of the propagation delay time (i.e., one cycle) is not for limiting the signal transmission system to which the invention in the second embodiment is applied. That is to say, even if the propagation delay time between respective adjacent devices is an other value (½ cycle, ⅓ cycle or the like), the invention of the second embodiment is applicable.

As shown in FIG. 3, the register 30 comprises a MIC 12, a SIC 22, a read data latch circuit (hereinafter referred to as "RLC") 31, and a write data latch circuit (hereinafter referred to as "WLC") 32.

The function of the MIC in the register 30 is the same as the function of the MIC in the master device 10. However, the MIC in the register 30 receives write data input from the WLC 32, and outputs read data to the PLC 31.

The function of the SIC in the register 30 is the same as that of the SIC in the slave device 20. However, the SIC in the register 30 receives read data input from the RLC 31, and outputs write data to the WLC 32.

The function of the RLC 31 is to "latch the read data input to the RLC 31 at a leading edge and a trailing edge of the clock and output the read data."

The function of the WLC 32 is to "latch the write data input to the WLC 32 at a leading edge and a trailing edge of the clock and output the write data."

Therefore, the register 30 (which is a combination of the MIC 12, the SIC 22, the RLC 31 and the WLC 32) has the following functions:

(1) to recognize the value of the read data based on the potential at the connection point of the MIC 12 and the data line, latch the recognized read data at the leading edge and the trailing edge of the clock, and change the potential at the connection point of the SIC 22 and the data line, based on the value of the latched read data; and (2) to recognize the value of the write data based on the potential at the connection point of the SIC 22 and the data line, latch the recognized write data at the leading edge and the trailing edge of the clock, and change the potential at the connection point of the MIC 12 and the data line, based on the value of the latched write data.

The configuration of the MIC in the register 30 is the same as that of the MIC in the master device 10.

The configuration of the SIC in the register 30 is the same as that of the SIC in the slave device 20.

Describing the configuration of the RLC 31, as shown in FIG. 3, the RLC 31 comprises a D flip-flop (hereinafter referred to as "DFF") 33, a DFF 34 and a selector 35.

The DFF 33 latches the read data input to the RLC 31 at the trailing edge of the clock.

The DFF 34 latches the read data input to the RLC 31 at the leading edge of the clock.

The selector 35 uses the clock as the selection signal. The selector 35 receives the output of the DFF 33 and the output of the DFF 34 as inputs, and selectively outputs the output of the DFF 33 if the selection signal is "H", and selectively outputs the output of the DFF 34 if the selection signal is "L". The output of the selector 35 is output from the RLC 31 as the read data latched by the RLC 31.

Describing the configuration of the WLC 32, as shown in FIG. 3, the WLC 32 comprises a DFF 36, a DFF 37 and a selector 38.

The DFF 36 latches the write data input to the WLC 32 at the trailing edge of the clock.

The DFF 37 latches the write data input to the WLC 32 at the leading edge of the clock.

The selector 38 uses the clock as the selection signal. The selector 38 receives the output of the DFF 36 and the output of the DFF 37 as inputs, and selectively outputs the output of the DFF 36 if the selection signal is "H", and selectively outputs the output of the DFF 37, if the selection signal is "L". The output of the selector 38 is output from the WLC 32 as the write data latched by the WLC 32.

The operation of the signal transmission system according to the above configuration will now be described.

Also in this system, as in the system of the first embodiment, all the constituents (master device 10, slave device 20, register 30) are connected to the data line via the MIC or the SIC.

That is to say, also in this system, the potential change at each connection point is performed by the operation described in (1) Potential change by means of the MIC 12 and (2) Potential change by means of the SIC 22 in the first embodiment.

In this embodiment, however, since any delay on the data line is not assumed, the terminating resistance is only one. Accordingly, the transistor for outputting the read data (transistor 24 in the SIC 22) is constituted of a transistor for passing a current of 10 mA. In this case, 50 Ω×10 mA makes the amplitude of 0.5 V.

As a result, the potential of the superimposed signal in this system is the same as that of the superimposed signal in the system of the first embodiment (see FIG. 1C).

The operation of the master device 10 in this system is the same as that of the master device 10 in the system of the first embodiment.

The operation of the slave device 20 in this system is the same as that of the slave device 20 in the system of the first embodiment.

That is to say, the operation in this system is one in which the above described functions of the register 30 (that is, the read data latch operation and the write data latch operation) are added to the operation of the system in the first embodiment. Therefore, these operations will be described below.

(1) Read Data Latch by Means of the Register 30

Figure 4:
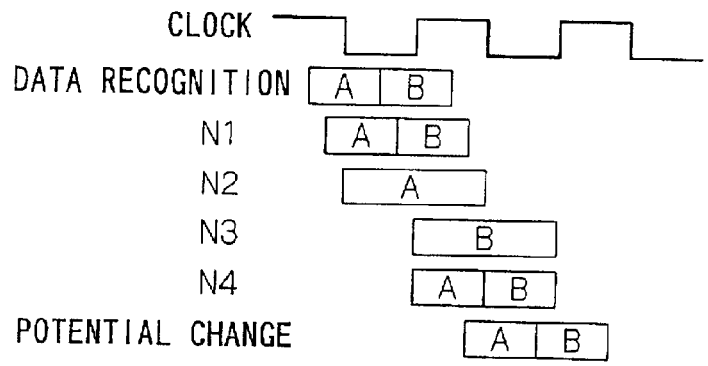
FIG. 4 is a timing chart showing the operation timing of a register 30.

FIG. 4 is a timing chart showing the operation timing of the register 30.

The MIC 12 of the register 30 recognizes and outputs the value of the read data, based on the potential at the connection point of the MIC 12 and the data line ("data recognition" in FIG. 4). This operation is the same as the operation described in (4) Read data recognition by means of the MIC 12 in the first embodiment.

The read data output by the MIC 12 is input to the RLC 31.

The DFF 33 latches the read data input to the RLC 31 (N1 in FIG. 4) at the trailing edge of the clock (N2 in FIG. 4).

The DFF 34 latches the read data input to the RLC 31 (N1 in FIG. 4) at the leading edge of the clock (N3 in FIG. 4).

The selector 35 selectively outputs the output of the DFF 33 (N2 in FIG. 4), if the clock is "H" (N4 in FIG. 4), and selectively outputs the output of the DFF 34 (N3 in FIG. 4), if the clock is "L" (N4 in FIG. 4).

The output of the selector 35 is output from the RLC 31 as the read data latched by the RLC 31.

The read data output by the RLC 31 is input to the SIC 22 in the register 30.

The SIC 22 in the register 30 changes the potential at the connection point of the SIC 22 and the data line ("potential change" in FIG. 4), based on the value of the read data input to the SIC 22. This operation is the same as the operation described in (2) Potential change by means of the SIC 22 in the first embodiment.

(2) Write Data Latch by Means of the Register 30

The operation timing of the write data latch by the register 30 is the same as that of the read data latch by the register 30 (see FIG. 4).

The SIC 22 in the register 30 recognizes and outputs the value of the write data, based on the potential at the connection point of the SIC 22 and the data line ("data recognition" in FIG. 4). This operation is the same as the operation described in (5) Write data recognition by means of the SIC 22 in the first embodiment.

The write data output by the SIC 22 is input to the WLC 32.

The DFF 36 latches the write data input to the WLC 32 (N1 in FIG. 4) at the trailing edge of the clock (N2 in FIG. 4).

The DFF 37 latches the write data input to the WLC 32 (N1 in FIG. 4) at the leading edge of the clock (N3 in FIG. 4).

The selector 38 selectively outputs the output of the DFF 36 (N2 in FIG. 4), if the clock is "H" (N4 in FIG. 4), and selectively outputs the output of the DFF 37 (N3 in FIG. 4), if the clock is "L" (N4 in FIG. 4).

The output of the selector 38 is output from the WLC 32 as the write data latched by the WLC 32.

The write data output by the WLC 32 is input to the MIC 12 in the register 30.

The MIC 12 in the register 30 changes the potential at the connection point of the MIC 12 and the data line ("potential change" in FIG. 4), based on the value of the write data input to the MIC 12. This operation is the same as the operation described in (1) Potential change by means of the MIC 12 in the first embodiment.

(Other Modifications)

The embodiments of the present invention have been described above with reference to drawings. However the specific configuration is not limited to these embodiments, and modifications in the design in a range not departing from the gist of the present invention is included in the present invention. One example thereof is described below.

(1) Applicable System

In the above describe embodiments, the description has been made, taking a system comprising a master device and slave devices as an example. However the present invention is not limited thereto, and the present invention is applicable to any signal transmission system, so long as there are two signals in the system, directed in opposite directions to each other on the same signal line.

(2) Amplitude Ratio

In the above described "Basic Concept", it has been described that "it is desirable that the amplitude of the write signal is at least twice as large as that of the read signal." However the present invention is not limited thereto, and if the read signal is totally reflected by the MIC 12, it is desirable to make the amplitude ratio at least three times.

The maximum value of the amplitude of the write signal is limited by a pulling-up power supply voltage Vcc, and when the Vcc is 2.5V, the maximum value of the amplitude of the write signal becomes 2.5V. Accordingly, if it is assumed that the amplitude of the read signal is 0.5V, the amplitude ratio is limited to five times.

FIG. 5 (FIGS. 5A to 5D) is a diagram showing one example of the potential of each signal, in the case where the amplitude ratio is three times. In FIG. 5A shows an amplitude of a read signal, FIG. 5B shows an amplitude of a write signal, and FIG. 5C shows an amplitude of a superimposed signal. Also, FIG. 5D shows an amplitude change in the read signal by means of the above described total reflection.

Figure 5A:
FIGS. 5A, 5B, 5C and 5D are diagrams showing the basic concept of the present invention, in the case where the amplitude ratio is three times.

The potential of the read signal shown in FIG. 5A is the same as that of the read signal shown in FIG. 1A.

Figure 5B:
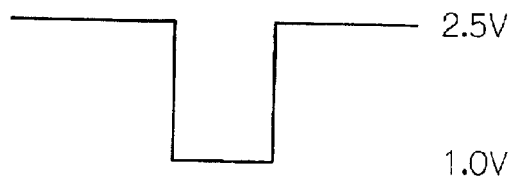
Figure 5C:
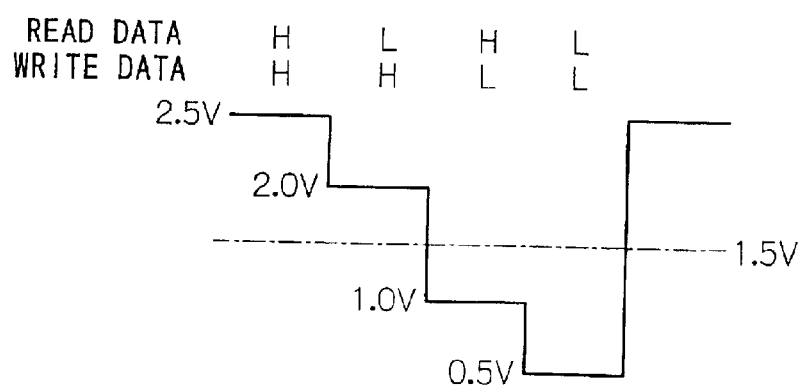

On the other hand, in the example shown in FIG. 5B, the amplitude of the write signal is made to be 1.5V, by designating the potential of the write signal showing the write data "H" as 2.5V, and designating the potential of the write signal showing the write data "L" as 1.0V.

As a result, the potential of the superimposed signal becomes 2.5V if the read data is "H" and the write data is "H", 2.0V if the read data is "L" and the write data is "H", 1.0V if the read data is "H" and the write data is "L", or 0.5V if the read data is "L" and the write data is "L".

Here, comparing a case where the amplitude ratio is twice (see FIG. 1) and the case where the amplitude ratio is three times (see FIG. 5), the potential difference between the lower limit potential of the superimposed signal when the write data is "H" and the upper limit potential of the superimposed signal when the write data is "L" becomes 2.0V−1.5V=0.5V, when the amplitude ratio is twice, and becomes 2.0V−1.0V=1.0V, when the amplitude ratio is three times.

Accordingly, as in the case of the SIC 22 described above, when the value of the write data is recognized by using a predetermined reference potential, the margin with respect to the reference potential can be made larger, in the case where the amplitude ratio is three times, than the case where the amplitude ratio is twice. As a result, the value of the write data can be more accurately recognized.

The amplitude of the read signal shown in FIG. 5A is 2.5V−2.0V=0.5V, and considerably smaller than the amplitude of the write signal (1.5V) shown in FIG. 5B.

Figure 5D:
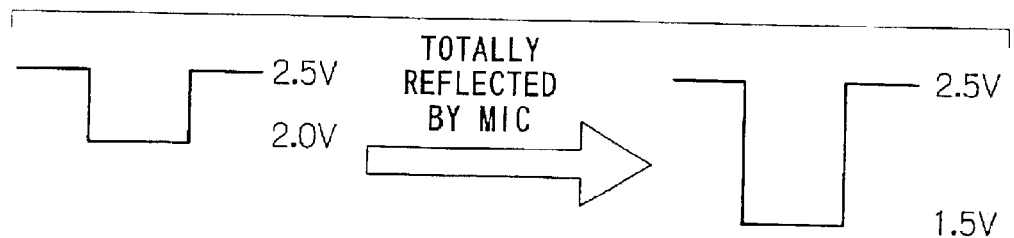

As shown in FIG. 5D, however, the amplitude of the read signal in the MIC 12 becomes actually twice (that is, 1.0V) due to the total reflection described above, and hence the same level of amplitude as that of the write signal can be realized.

(3) Position of the Register 30

The read/write operation of the slave device is performed between the slave device and a register close to the master device.

Accordingly, in the system of the second embodiment (see FIG. 3), if a propagation delay on the data line is taken into consideration, it is desirable to make the length of the data line between the MIC 22 in the register 30 and the slave device 20 short, even if the length of the data line between the MIC 12 in the register 30 and the slave device 20 is sacrificed.

As described above, according to the present invention, even in the case where two signals are superimposed on each other on the same signal line, the data can be accurately recognized, without decreasing the transmission efficiency, and without making the control complicated.

What is claimed is:

1. A signal transmission system comprising:
    a first device;
    a second device; and
    a predetermined signal line connecting the first device and the second device, wherein
    a first signal directed from the first device to the second device and a second signal directed from the second device to the first device are transferred through the predetermined signal line,
    the amplitude of the first signal and the amplitude of the second signal are different,
    the amplitude of the second signal is (V0−V1), and
    the amplitude of the first signal is (V0−V2), and
    a value indicated by the first signal is recognized using (V1+V2)/2 as a reference potential.

2. A signal transmission system comprising:
    a first device;
    a second device; and
    a predetermined signal line connecting the first device and the second device, wherein
    a first signal directed from the first device to the second device and a second signal directed from the second device to the first device are transferred through the predetermined signal line,
    the amplitude of the first signal and the amplitude of the second signal are different
    the amplitude of the second signal is (V0−V1), and
    the amplitude of the first signal is (V0−V2), and
    if the potential of the first signal is V0, a value indicated by the second signal is recognized using (V0+V1)/2 as a reference potential, and
    if the potential of the first signal is V2, a value indicated by the second signal is recognized using (V1+2V2−V0)/2 as a reference potential.

3. A signal transmission system according to either one of the claim 1 and claim 2, comprising:
    a third device in which the first signal received from the first device is sent to the second device without changing the amplitude, and the second signal received from the second device is sent to the first device without changing the amplitude.

4. A signal transmission system according to either one of the claim 1 and claim 2, wherein the amplitude of the first signal is at least twice as large as that of the second signal.

5. A signal transmission system according to either one of the claim 1 and claim 2, wherein
    the second signal is totally reflected by the first device, and the amplitude of the first signal is at least three times as large as that of the second signal.

6. A signal transmission system according to either one of the claim 1 and claim 2, wherein
    the first device is a master device;
    the second device is a slave device; and
    the first signal is a write signal indicating a value of write data written to the slave device from the master device; and
    the second signal is a read signal indicating a value of read data read out from the slave device to the master device.

7. A signal transmission system comprising:
    a first device;
    a second device;
    a predetermined signal line connecting the first device and the second device; and
    a third device disposed on the predetermined signal line between the first device and the second device, wherein
    a first signal directed from the first device to the second device and a second signal directed from the second device to the first device are transferred through the predetermined signal line,
    the amplitude of the first signal and the amplitude of the second signal are different,
    the first device is a master device,
    the second device is a slave device, and
    the third device in which the first signal received from the first device is sent to the second device without changing the amplitude, and the second signal received from the second device is sent to the first device without changing the amplitude, and
    the first signal is a write signal indicating a value of write data written to the slave device from the master device, and
    the second signal is a read signal indicating a value of read data read out from the slave device to the master device, and
    the third device is a register for latching the write data and the read data.

8. A signal transmission system according to claim 7, wherein the line length of the signal line for transmitting the write signal from the register to the slave device is shorter than that of the signal line for transmitting the read signal from the register to the slave device.

* * * * *